US009818418B2

(12) United States Patent
Kjoerling et al.

(10) Patent No.: US 9,818,418 B2
(45) **Date of Patent: *Nov. 14, 2017**

(54) HIGH FREQUENCY REGENERATION OF AN AUDIO SIGNAL WITH SYNTHETIC SINUSOID ADDITION

(71) Applicant: Dolby International AB, Amsterdam Zuidoost (NL)

(72) Inventors: Kristofer Kjoerling, Solna (SE); Per Ekstrand, Saltsjobaden (SE); Holger Hoerich, Fürth (DE)

(73) Assignee: Dolby International AB, Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,897

(22) Filed: Mar. 8, 2017

(65) Prior Publication Data

US 2017/0178647 A1 Jun. 22, 2017

Related U.S. Application Data

(60) Division of application No. 15/133,410, filed on Apr. 20, 2016, which is a division of application No.
(Continued)

(30) Foreign Application Priority Data

Nov. 29, 2001 (SE) ........................................ 0104004

(51) Int. Cl.
*G10L 15/00* (2013.01)
*G10L 19/02* (2013.01)
(Continued)

(52) U.S. Cl.
CPC .......... *G10L 19/0208* (2013.01); *G10L 19/07* (2013.01); *G10L 19/167* (2013.01); *G10L 19/265* (2013.01); *G10L 19/028* (2013.01)

(58) Field of Classification Search
CPC ............... G10L 19/0204; G10L 21/038; G10L 19/0208; G10L 21/0388; G10L 19/02;
(Continued)

(56) References Cited

U.S. PATENT DOCUMENTS 3,947,827 A 3/1976 Dautremont, Jr. et al.
4,053,711 A 10/1977 DeFreitas et al.
(Continued)

FOREIGN PATENT DOCUMENTS

DE 19947098 11/2000
EP 0478096 1/1987
(Continued)

OTHER PUBLICATIONS

Bauer, D., "Examinations Regarding the Similarity of Digital Stereo Signals in High Quality Music Reproduction", University of Erlangen-Neurnberg, 1991, 1-30.
(Continued)

*Primary Examiner* — Abdelali Serrou

(57) ABSTRACT

A method performed in an audio decoder for reconstructing an original audio signal having a lowband portion and a highband portion is disclosed. The method includes receiving an encoded audio signal and extracting reconstruction parameters from the encoded audio signal. The method further includes decoding the encoded audio signal with a core audio decoder to obtain a decoded lowband portion and regenerating the highband portion based at least in part on a cross over frequency and the decoded lowband portion to obtain a regenerated highband portion. The method also includes creating a synthetic sinusoid with a level based at least in part on a spectral envelope value for the particular subband and a noise floor value for the particular subband and adding the synthetic sinusoid to the regenerated highband portion in the particular frequency band specified by
(Continued)

the location information. Finally, the method includes combining the lowband portion and the regenerated highband portion to obtain a full bandwidth audio signal.

5 Claims, 11 Drawing Sheets

Related U.S. Application Data

13/865,450, filed on Apr. 18, 2013, now Pat. No. 9,431,020, which is a continuation of application No. 13/206,440, filed on Aug. 9, 2011, now Pat. No. 8,447,621, which is a division of application No. 12/273,782, filed on Nov. 19, 2008, now Pat. No. 8,112,284, which is a division of application No. 10/497,450, filed as application No. PCT/EP02/13462 on Nov. 28, 2002, now Pat. No. 7,469,206.

(51) Int. Cl.
*G10L 19/26* (2013.01)
*G10L 19/07* (2013.01)
*G10L 19/16* (2013.01)
*G10L 19/028* (2013.01)

(58) Field of Classification Search
CPC ..... G10L 19/032; G10L 19/06; G10L 19/008; G10L 19/0212; G10L 19/022; G10L 19/24; G10L 19/26; G10L 25/18; G10L 19/025; G10L 19/028; G10L 19/03; G10L 19/07; G10L 19/093; G10L 21/04; G10L 19/00; G10L 19/265; G10L 19/167; G10L 19/20; G10L 25/48; G10L 21/02; G10L 25/69; G10L 15/22; G10L 19/04; G10L 21/0264; G10L 19/0017; G10L 19/035; G10L 19/165; G10L 2025/783; G10L 25/93; G10L 21/088
See application file for complete search history.

(56) References Cited

U.S. PATENT DOCUMENTS 4,166,924 A 9/1979 Berkley et al.
4,216,354 A 8/1980 Esteban et al.
4,330,689 A 5/1982 Kang et al.
4,569,075 A 2/1986 Nussbaumer
4,667,340 A 5/1987 Arjmand et al.
4,672,670 A 6/1987 Wang et al.
4,700,362 A 10/1987 Todd et al.
4,700,390 A 10/1987 Machida
4,706,287 A 11/1987 Blackmer et al.
4,776,014 A * 10/1988 Zinser, Jr. ............... G10L 19/08 704/262
4,969,040 A 11/1990 Gharavi
5,001,758 A 3/1991 Galand et al.
5,054,072 A 10/1991 McAulay et al.
5,093,863 A 3/1992 Galand et al.
5,127,054 A 6/1992 Hong et al.
5,235,420 A 8/1993 Gharavi
5,261,027 A 11/1993 Taniguchi et al.
5,285,520 A 2/1994 Matsumoto et al.
5,293,449 A 3/1994 Tzeng
5,309,526 A 5/1994 Pappas et al.
5,321,793 A 6/1994 Drogo De Iacovo et al.
5,396,237 A 3/1995 Ohta
5,455,888 A 10/1995 Iyengar et al.
5,463,424 A 10/1995 Dressler
5,490,233 A 2/1996 Kovacevic
5,517,581 A 5/1996 Johnston et al.
5,559,891 A 9/1996 Kuusama et al.
5,579,434 A 11/1996 Kudo et al.
5,581,562 A 12/1996 Lin et al.
5,581,652 A 12/1996 Abe et al.
5,581,653 A 12/1996 Todd
5,604,810 A 2/1997 Yanagawa
5,613,035 A 3/1997 Kim
5,632,005 A 5/1997 Davis et al.
5,671,287 A 9/1997 Gerzon
5,677,985 A 10/1997 Ozawa
5,687,191 A 11/1997 Lee et al.
5,701,346 A 12/1997 Herre et al.
5,701,390 A 12/1997 Griffin et al.
5,757,938 A 5/1998 Akagiri et al.
5,787,387 A 7/1998 Aguilar
5,848,164 A 12/1998 Levine
5,862,228 A 1/1999 Davis
5,873,065 A 2/1999 Akagiri et al.
5,875,122 A 2/1999 Acharya
5,878,388 A 3/1999 Nishiguchi et al.
5,883,962 A 3/1999 Hawks
5,889,857 A 3/1999 Boudy et al.
5,890,108 A 3/1999 Yeldener
5,890,125 A 3/1999 Davis et al.
5,915,235 A * 6/1999 DeJaco ............... G10L 21/0364 704/203
5,950,153 A 9/1999 Ohmori et al.
5,951,235 A 9/1999 Young et al.
RE36,478 E 12/1999 McAulay et al.
6,014,619 A 1/2000 Wuppermann et al.
6,144,937 A 11/2000 Ali
6,226,325 B1 5/2001 Nakamura
6,233,551 B1 5/2001 Cho et al.
6,298,361 B1 10/2001 Suzuki
6,389,006 B1 5/2002 Bialik
6,456,657 B1 9/2002 Yeap et al.
6,507,658 B1 1/2003 Abel et al.
6,611,800 B1 8/2003 Nishiguchi et al.
6,674,876 B1 * 1/2004 Hannigan ............. G06T 1/0028 375/E7.089
6,680,972 B1 * 1/2004 Liljeryd ................ G10L 21/038 375/240
6,754,394 B2 * 6/2004 Boliek .................... H03M 7/30 375/E7.016
6,771,777 B1 8/2004 Gbur et al.
6,772,114 B1 8/2004 Sluijter et al.
6,853,682 B2 2/2005 Min
6,871,106 B1 3/2005 Ishikawa et al.
6,879,955 B2 4/2005 Rao
6,895,375 B2 5/2005 Malah et al.
6,988,066 B2 1/2006 Malah
7,050,972 B2 * 5/2006 Henn .................... G10L 21/038 704/228
7,095,907 B1 8/2006 Berkner et al.
7,151,802 B1 * 12/2006 Bessette .................. G10L 19/26 375/259
7,191,123 B1 3/2007 Bessette et al.
7,191,136 B2 * 3/2007 Sinha .................. G10L 19/0208 704/205
7,200,561 B2 4/2007 Moriya et al.
7,205,910 B2 4/2007 Honma et al.
7,216,074 B2 5/2007 Malah et al.
7,260,521 B1 8/2007 Bessette et al.
7,283,967 B2 10/2007 Nishio et al.
7,328,160 B2 2/2008 Nishio et al.
7,382,886 B2 6/2008 Henn et al.
7,580,893 B1 * 8/2009 Suzuki ................ G10L 19/0204 704/203
7,720,676 B2 5/2010 Philippe et al.
9,208,795 B2 * 12/2015 Yamamoto ............ G10L 21/038
2002/0010577 A1 1/2002 Matsumoto et al.
2002/0037086 A1 3/2002 Irwan et al.
2002/0040299 A1 4/2002 Makino et al.
2002/0103637 A1 8/2002 Henn et al.
2002/0123975 A1 9/2002 Poluzzi et al.
2003/0063759 A1 4/2003 Brennan et al.
2003/0088423 A1 5/2003 Nishio et al.
2003/0093278 A1 5/2003 Malah
2003/0206624 A1 11/2003 Domer et al.
2003/0215013 A1 11/2003 Budnikov

(56) References Cited

U.S. PATENT DOCUMENTS

| | | | |
|---|---|---|---|
| 2004/0117177 | A1 | 6/2004 | Kjorling et al. |
| 2004/0252772 | A1 | 12/2004 | Renfors et al. |
| 2005/0074127 | A1 | 4/2005 | Herre et al. |
| 2005/0187759 | A1 | 8/2005 | Malah et al. |

FOREIGN PATENT DOCUMENTS

| | | |
|---|---|---|
| EP | 0273567 | 7/1988 |
| EP | 0485444 | 5/1992 |
| EP | 501690 | 1/1997 |
| EP | 0858067 | 8/1998 |
| EP | 0918407 | 5/1999 |
| EP | 0989543 | 5/2000 |
| EP | 1119911 | 7/2000 |
| EP | 1107232 | 6/2001 |
| GB | 2100430 | 12/1982 |
| GB | 2344036 | 1/2004 |
| JP | 02012299 | 1/1990 |
| JP | 02177782 | 1/1990 |
| JP | 03214956 | 9/1991 |
| JP | 04301688 | 10/1992 |
| JP | 5-191885 | 7/1993 |
| JP | 05165500 | 7/1993 |
| JP | 06-85607 | 3/1994 |
| JP | 06090209 | 3/1994 |
| JP | 6-118995 | 4/1994 |
| JP | 06202629 | 7/1994 |
| JP | 06215482 | 8/1994 |
| JP | H08-123495 | 5/1996 |
| JP | 08254994 | 10/1996 |
| JP | 08305398 | 11/1996 |
| JP | H08-263096 | 11/1996 |
| JP | 09-500252 | 1/1997 |
| JP | 09-046233 | 2/1997 |
| JP | 09-055778 | 2/1997 |
| JP | 09-501286 | 2/1997 |
| JP | 09-090992 | 4/1997 |
| JP | 09-101798 | 4/1997 |
| JP | 09505193 | 5/1997 |
| JP | 09261064 | 10/1997 |
| JP | H09-282793 | 10/1997 |
| JP | H10-504170 | 4/1998 |
| JP | 11262100 | 9/1999 |
| JP | 11317672 | 11/1999 |
| JP | 2000083014 | 3/2000 |
| JP | 2000505266 | 4/2000 |
| JP | 2000-267699 | 9/2000 |
| JP | 2001184090 | 7/2001 |
| JP | 2001-521648 | 11/2001 |
| JP | 2004535145 | 11/2004 |
| KR | 96003455 | 3/1996 |
| KR | 960012475 | 9/1996 |
| WO | WO-9504442 | 2/1995 |
| WO | WO-9516333 | 6/1995 |
| WO | WO-97/00594 | 1/1997 |
| WO | WO-97/30438 | 8/1997 |
| WO | WO-9803036 | 1/1998 |
| WO | WO-9803037 | 1/1998 |
| WO | WO-98/57436 | 12/1998 |
| WO | WO-9857436 | 12/1998 |
| WO | WO00/45379 | 8/2000 |
| WO | WO-00/45379 | 8/2000 |
| WO | WO-0045378 | 8/2000 |
| WO | WO-00/79520 | 12/2000 |
| WO | WO-03007656 | 1/2003 |
| WO | WO2004/027368 | 4/2004 |

OTHER PUBLICATIONS

Chen, S., "A Survey of Smoothing Techniques for ME Models", IEEE, R. Rosenfeld (Additional Author), Jan. 2000, 37-50.

Cheng, Yan M. et al., "Statistical Recovery of Wideband Speech from Narrowband Speech", IEEE Trans. Speech and Audio Processing, vol. 2, No. 4, Oct. 1994, 544-548.

Chennoukh, S. et al., "Speech Enhancement Via Frequency Bandwidth Extension Using Line Spectral Frequencies", IEEE Conference on Acoustics, Speech, and Signal Processing Proceedings (ICASSP), 2001, 665-668.

Chouinard, et al., "Wideband communications in the high frequency band using direct sequence spread spectrum with error control coding", IEEE Military Communications Conference, Nov. 5, 1995, pp. 560-567.

Depalle, et al., "Extraction of Spectral Peak Parameters Using a Short-time Fourier Transform Modeling and No Sidelobe Windows", IEEE ASSP Workshop on Volume, Oct. 1997, 4 pages.

Dutilleux, Pierre, "Filters, Delays, Modulations and Demodulations: A Tutorial", Retrieved from internet address: http://on1.akm.de/skm/Institute/Musik/SKMusik/veroeffentlicht/PD.sub.—Fi—Iters, No publication date can be found. Retrieved on Feb. 19, 2009, Total of 13 pages.

Enbom, Niklas et al., "Bandwidth Expansion of Speech Based on Vector Quantization of the Mel Frequency Cepstral Coefficients", Proc. IEEE Speech Coding Workshop (SCW), 1999, 171-173.

Epps, Julien , "Wideband Extension of Narrowband Speech for Enhancement and Coding", School of Electical Engineering and Telecommunications, The University of New South Wales, Sep. 2000, 1-155.

George, et al., "Analysis-by-Synthesis/Overlap-Add Sinusoidal Modeling Applied to the Analysis and Synthesis of Musical Tones", Journal of Audio Engineering Society, vol. 40, No. 6, Jun. 1992, 497-516.

Herre, Jurgen et al., "Intensity Stereo Coding", Preprints of Papers Presented at the Audio Engineering Society Convention, vol. 96, No. 3799, XP009025131, Feb. 26, 1994, 1-10.

Holger, C et al., "Bandwidth Enhancement of Narrow-Band Speech Signals", Signal Processing VII Theories and Applications, Proc. of EUSIPCO-94, Seventh European Signal Processing Conference; European Association for Signal Processing Sep. 13-16, 1994, 1178-1181.

Kubin, Gernot, "Synthesis and Coding of Continuous Speech With the Nonlinear Oscillator Model", Institute of Communications and High-Frequency Engineering, Vienna University of Technology, Vienna, Austria, IEEE, 1996, 267-270.

Makhoul, et al., "High-Frequency Regeneration in Speech Coding Systems", Proc. Intl. Conf. Acoustic: Speech, Signal Processing, Apr. 1979, pp. 428-431.

McNally, G.W., "Dynamic Range Control of Digital Audio Signals", Journal of Audio Engineering Society, vol. 32, No. 5, May 1984, 316-327.

Princen, John P. et al., "Analysis/Synthesis Filter Bank Design Based on Time Domain Aliasing Cancellation", IEEE Trans. on Acoustics, Speech, and Signal Processing, vol. ASSP-34, No. 5, Oct. 5, 1986, 1153-1161.

Proakis, "Digital Signal Processing", Sampling and Reconstrction of Signals, Chapter 9, Monolakic (Additional Author) Submitted with a Declaration 1, 1996, 771-773.

Schroeder, Manfred R., "An Artificial Stereophonic Effect Obtained from Using a Single Signal", 9th Annual Meeting, Audio Engineering Society, Oct. 8-12, 1957, 1-5.

Taddei, et al., "A Scalable Three Bit-rates 8-14.1-24 kbit/s Audio Coder", vol. 55, Sep. 2000, pp. 483-492.

Vaidyanathan, P. P., "Multirate Digital Filters, Filter Banks,Polyphase Networks, and Applications: A Tutorial", Proceedings of the IEEE, vol. 78, No. 1, Jan. 1990, 56-93.

Valin, et al., "Bandwidth Extension of Narrowband Speech for Low Bit-Rate Wideband Coding", IEEE Workshop Speech Coding Proceedings, Sep. 2000, pp. 130-132.

Yasukawa, Hiroshi , "Restoration of Wide Band Signal from Telephone Speech Using Linear Prediction Error Processing", Conf. Spoken Language Processing (ICSLP), 1996, 901-904.

Zolzer, Udo, "Digital Audio Signal Processing", John Wiley & Sons Ltd., England, 1997, 207-247.

Brandenburg, , "Introductions to Perceptual Coding", Published by Audio Engineering Society in "Collected Papers on Digital Audio Bit-Rate Reduction", Manuscript received on Mar. 13, 1996, 1996, Total of 11 pages.

(56) References Cited

OTHER PUBLICATIONS

Britanak, et al., "A new fast algorithm for the unified forward and inverse MDCT/MDST Computation", Signal Processing, vol. 82, Mar. 2002, pp. 433-459.
Cruz-Roldan, et al., "Alternating Analysis and Synthesis Filters: A New Pseudo-QMF Bank", Oct. 2001.
Ekstrand, Per , "Bandwidth extension of audio signals by spectral band replication", Proc.1st IEEE Benelux Workshop on Model Based Processing and Coding of Audio, Leuven, Belgium, Nov. 15, 2002, pp. 53-58.
Gilchrist, N. et al., "Collected Papers on Digital Audio Bit-Rate Reduction", Audio-Engineering Society, No. 3, 1996, Total of 11 pages.
Gilloire, et al., "Adaptive Filtering in Subbands with Critical Sampling: Analysis, Experiments, and Application to Acoustic Echo", 1992.
Gilloire, et al., "Adaptive Filtering in Subbands with Critical Sampling: Analysis, Experiments, and Application to Acoustic Echo Cancellation", IEEE Transaction on Signal Processing, vol. 40, No. 8, Aug. 1992, 1862-1875.
Harteneck, et al., "Filterbank design for oversampled filter banks without aliasing in the subbands", Electronic Letters, vol. 33, No. 18, Sug. 28, 1997, pp. 1538-1539.
Holger, C et al., "Bandwidth Enhancement of Narrow-Band Speech Signals", Signal Processing VII Theories and Applications, Proc. of EUSIPC0-94, Seventh European Signal Processing Conference; European Association for Signal Processing, Sep. 13-16, 1994, 1178-1181.
Koilpillai, et al., "A Spectral Factorization Approach to Pseudo-QMF Desig", IEEE Transactions on Signal Processing, Jan. 1993, 82-92.
Kok, et al., "Multirate filter banks and transform coding gain", IEEE Transactions on Signal Processing, vol. 46 (7), Jul. 1998,2041-2044.
Nguyen, , "Near-Perfect-Reconstruction Pseudo-QMF Banks", IEEE Transaction on Signal Processing, vol. 42, No. 1, Jan. 1994, 65-76.
Ramstad, T.A. et al., "Cosine-modulated analysis-syntheses filter bank with critical sampling and perfect reconstruction", IEEE Int'l. Conf. ASSP, Toronto, Canada, May 1991, 1789-1792.
Tam, et al., "Highly Oversampled Subband Adaptive Filters for Noise Cancellation on a Low-Resource DSP System", ICSLP, Sep. 2002, Total of 4 pages.
Weiss, S. et al., "Efficient implementations of complex and real valued filter banks for comparative subband processing with an application to adaptive filtering", Proc. Int'l Symposium Communication Systems & Digital Signal Processing, vol. 1, Sheffield, UK, Apr. 1998, 4 pages.
Ziegler, et al., "Enhancing mp3 with SBR: Fetaures and Capabilities of the new mp3PRO Algorithm", AES 112th Convention, Munich, Germany, May 2002, Total of 7 pages.
Zolzer, Udo, "Digital Audio Signal Processing", John Wiley & Sons Ltd., England, 1997, pp. 207-247.

* cited by examiner

HIGH FREQUENCY REGENERATION OF AN AUDIO SIGNAL WITH SYNTHETIC SINUSOID ADDITION

CROSS-REFERENCE TO RELATED APPLICATIONS

This application is a divisional of U.S. patent application Ser. No. 15/133,410 filed on Apr. 20, 2016, which is a divisional of U.S. patent application Ser. No. 13/865,450 filed on Apr. 18, 2013 (now U.S. Pat. No. 9,431,020), which is continuation application of U.S. patent application Ser. No. 13/206,440 filed on Aug. 9, 2011 (now U.S. Pat. No. 8,447,621), which is a divisional application of U.S. patent application Ser. No. 12/273,782 filed on Nov. 19, 2008 (now U.S. Pat. No. 8,112,284), which is a divisional application of U.S. patent application Ser. No. 10/497,450 filed May 27, 2004 (now U.S. Pat. No. 7,469,206), which is a US national phase application of PCT/EP02/13462 filed on Nov. 28, 2002 which claims priority to Swedish Patent Application No. 0104004-7 filed Nov. 29, 2001. All of these applications are hereby incorporated in their entireties by this reference thereto.

TECHNICAL FIELD

The present invention relates to source coding systems utilising high frequency reconstruction (HFR) such as Spectral Band Replication, SBR [WO 98/57436] or related methods. It improves performance of both high quality methods (SBR), as well as low quality copy-up methods [U.S. Pat. No. 5,127,054]. It is applicable to both speech coding and natural audio coding systems.

BACKGROUND OF THE INVENTION

High frequency reconstruction (HFR) is a relatively new technology to enhance the quality of audio and speech coding algorithms. To date it has been introduced for use in speech codecs, such as the wideband AMR coder for 3rd generation cellular systems, and audio coders such as mp3 or AAC, where the traditional waveform codecs are supplemented with the high frequency reconstruction algorithm SBR (resulting in mp3PRO or AAC+SBR).

High frequency reconstruction is a very efficient method to code high frequencies of audio and speech signals. As it cannot perform coding on its own, it is always used in combination with a normal waveform based audio coder (e.g. AAC, mp3) or a speech coder. These are responsible for coding the lower frequencies of the spectrum. The basic idea of high frequency reconstruction is that the higher frequencies are not coded and transmitted, but reconstructed in the decoder based on the lower spectrum with help of some additional parameters (mainly data describing the high frequency spectral envelope of the audio signal) which are transmitted in a low bit rate bit stream, which can be transmitted separately or as ancillary data of the base coder. The additional parameters could also be omitted, but as of today the quality reachable by such an approach will be worse compared to a system using additional parameters.

Especially for Audio Coding, HFR significantly improves the coding efficiency especially in the quality range “sounds good, but is not transparent”. This has two main reasons:

- Traditional waveform codecs such as mp3 need to reduce the audio bandwidth for very low bitrates since otherwise the artefact level in the spectrum is getting too high. HFR regenerates those high frequencies at very low cost and with good quality. Since HFR allows a low-cost way to create high frequency components, the audio bandwidth coded by the audio coder can be further reduced, resulting in less artefacts and better worst case behaviour of the total system.
- HFR can be used in combination with downsampling in the encoder/upsampling in the decoder. In this frequently used scenario the HFR encoder analyses the full bandwidth audio signal, but the signal fed into the audio coder is sampled down to a lower sampling rate. A typical example is HFR rate at 44.1 kHz, and audio coder rate at 22.05 kHz. Running the audio encoder at a low sampling rate is an advantage, because it is usually more efficient at the lower sampling rate. At the decoding side, the decoded low sample rate audio signal is upsampled and the HFR part is added—thus frequencies up to the original Nyquist frequency can be generated although the audio coder runs at e.g. half the sampling rate.

A basic parameter for a system using HFR is the so-called cross over frequency (COF), i.e. the frequency where normal waveform coding stops and the HFR frequency range begins. The simplest arrangement is to have the COF at a constant frequency. A more advanced solution that has been introduced already is to dynamically adjust the COF to the characteristics of the signal to be coded.

A main problem with HFR is that an audio signal may contain components in higher frequencies which are difficult to reconstruct with the current HFR method, but could more easily be reproduced by other means, e.g. a waveform coding methods or by synthetic signal generation. A simple example is coding of a signal only consisting of a sine wave above the COF, FIG. 1. Here the COF is 5.5 kHz. As there is no useful signal available in the low frequencies, the HFR method, based on extrapolating the lowband to obtain a highband, will not generate any signal. Accordingly, the sine wave signal cannot be reconstructed. Other means are needed to code this signal in a useful way. In this simple case, HFR systems providing flexible adjustment of COF can already solve the problem to some extent. If the COF is set above the frequency of the sine wave, the signal can be coded very efficiently using the core coder. This assumes, however, that it is possible to do so, which might not always be the case. As mentioned earlier, one of the main advantages of combining HFR with audio coding is the fact that the core coder can run at half the sampling rate (giving higher compression efficiency). In a realistic scenario, such as a 44.1 kHz system with the core running at 22.05 kHz, such a core coder can only code signals up to around 10.5 kHz. However, apart from that, the problem gets significantly more complicated even for parts of the spectrum within the reach of the core coder when considering more complex signals. Real world signals may e.g. contain audible sine wave-like components at high frequencies within a complex spectrum (e.g. little bells), FIG. 2. Adjusting the COF is not a solution in this case, as most of the gain achieved by the HFR method would diminish by using the core coder for a much larger part of the spectrum.

SUMMARY OF THE INVENTION

A solution to the problems outlined above, and subject of this invention, is therefore the idea of a highly flexible HFR system that does not only allow to change the COF, but allows a much more flexible composition of the decoded/reconstructed spectrum by a frequency selective composition of different methods.

Basis for the invention is a mechanism in the HFR system enabling a frequency dependent selection of different coding or reconstruction methods. This could be done for example with the 64 band filter bank analysis/synthesis system as used in SBR. A complex filter bank providing alias free equalisation functions can be especially useful.

The main inventive step is that the filter bank is now used not only to serve as a filter for the COF and the following envelope adjustment. It is also used in a highly flexible way to select the input for each of the filter bank channels out of the following sources:

- waveform coding (using the core coder);
- transposition (with following envelope adjustment);
- waveform coding (using additional coding beyond Nyquist);
- parametric coding;
- any other coding/reconstruction method applicable in certain parts of the spectrum;
- or any combination thereof.

Thus, waveform coding, other coding methods and HFR reconstruction can now be used in any arbitrary spectral arrangement to achieve the highest possible quality and coding gain. It should be evident however, that the invention is not limited to the use of a subband filterbank, but it can of course be used with arbitrary frequency selective filtering.

The present invention comprises the following features:

- a HFR method utilising the available lowband in said decoder to extrapolate a highband;
- on the encoder side, using the HFR method to assess, within different frequency regions, where the HFR method does not, based on the frequency range below COF, correctly generate a spectral line or spectral lines similar to the spectral line or spectral lines of the original signal;
- coding the spectral line or spectral lines, for the different frequency regions;
- transmitting the coded spectral line or spectral lines for the different frequency regions from the encoder to the decoder;
- decoding the spectral line or spectral lines;
- adding the decoded spectral line or spectral lines to the different frequency regions of the output from the HFR method in the decoder;
- the coding is a parametric coding of said spectral line or spectral lines;
- the coding is a waveform coding of said spectral line or spectral lines;
- the spectral line or spectral lines, parametrically coded, are synthesised using a subband filterbank;
- the waveform coding of the spectral line or spectral lines is done by the underlying core coder of the source coding system;
- the waveform coding of the spectral line or spectral lines is done by an arbitrary waveform coder.

In other embodiments, a method performed in an audio decoder for reconstructing an original audio signal having a lowband portion and a highband portion is disclosed. The method includes receiving an encoded audio signal and extracting reconstruction parameters from the encoded audio signal. The encoded audio signal includes spectral coefficients of the lowband portion and not the highband portion, and the reconstruction parameters include a cross over frequency, spectral envelope information, and location information. The spectral envelope information includes a spectral envelope value for each frequency band of the highband portion, and the location information specifies a particular frequency band of the highband portion. The method further includes decoding the encoded audio signal with a core audio decoder to obtain a decoded lowband portion and regenerating the highband portion based at least in part on the cross over frequency and the decoded lowband portion to obtain a regenerated highband portion. The core audio decoder operates at a first sampling frequency and the regenerating operates at a second sampling frequency that is twice the first sampling frequency. The method also includes creating a synthetic sinusoid with a level based at least in part on the spectral envelope value for the particular subband and a noise floor value for the particular subband and adding the synthetic sinusoid to the regenerated highband portion in the particular frequency band specified by the location information. Finally, the method includes combining the lowband portion and the regenerated highband portion to obtain a full bandwidth audio signal. The audio decoder may be implemented at least in part with hardware.

BRIEF DESCRIPTION OF THE DRAWINGS

The present invention will now be described by way of illustrative examples, not limiting the scope or spirit of the invention, with reference to the accompanying drawings, in which.

DESCRIPTION OF PREFERRED EMBODIMENTS

The below-described embodiments are merely illustrative for the principles of the present invention for improvement of high frequency reconstruction systems. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Figure 9:
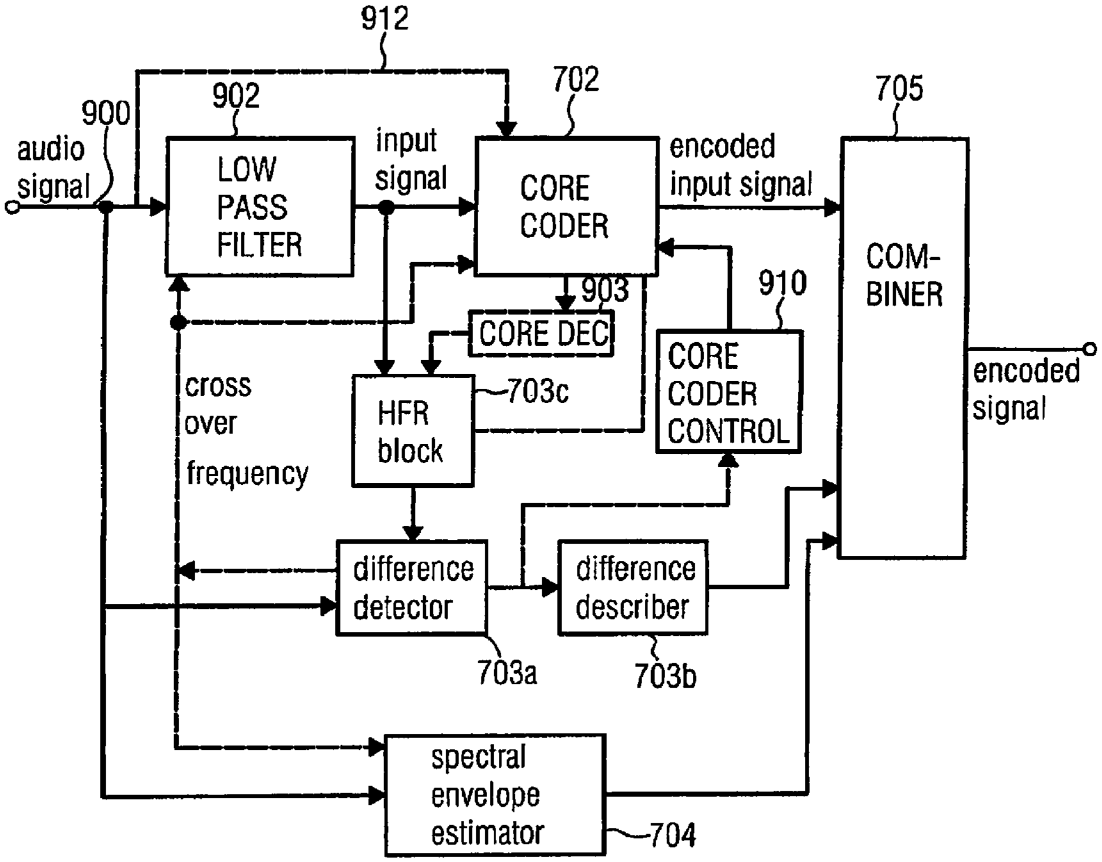
FIG. 9 illustrates a schematic diagram of an inventive encoder.

FIG. 9 illustrates an inventive encoder. The encoder includes a core coder 702. It is to be noted here that the inventive method can also be used as a so-called add-on module for an existing core coder. In this case, the inventive encoder includes an input for receiving an encoded input signal output by a separate standing core coder 702.

The inventive encoder in FIG. 9 additionally includes a high frequency regeneration block 703*c*, a difference detector 703*a*, a difference describer block 703*b* as well as a combiner 705.

In the following, the functional interdependence of the above-referenced means will be described.

In particular the inventive encoder is for encoding an audio signal input at an audio signal input 900 to obtain an encoded signal. The encoded signal is intended for decoding using a high frequency regenerating technique which is suited for generating frequency components above a predetermined frequency which is also called the cross-over frequency, based on the frequency components below the predetermined frequency.

It is to be noted here that as a high frequency regeneration technique, a broad variety of such techniques that became known recently can be used. In this regard, the term "frequency component" is to be understood in a broad sense. This term at least includes spectral coefficients obtained by means of a time domain/frequency domain transform such as a FFT, a MDCT or something else. Additionally, the term "frequency component" also includes band pass signals, i.e., signals obtained at the output of frequency-selective filters such as a low pass filter, a band pass filter or a high pass filter.

Irrespective of the fact, whether the core coder 702 is part of the inventive encoder, or whether the inventive encoder is used as an add-on module for an existing core coder, the encoder includes means for providing an encoded input signal, which is a coded representation of an input signal, and which is coded using a coding algorithm. In this regard, it is to be remarked that the input signal represents a frequency content of the audio signal below a predetermined frequency, i.e., below the so-called cross-over frequency. To illustrate the fact that the frequency-content of the input signal only includes a low-band part of the audio signal, a low pass filter 902 is shown in FIG. 9. The inventive encoder indeed can have such a low pass filter. Alternatively, such a low pass filter can be included in the core coder 702. Alternatively, a core coder can perform the function of discarding a frequency band of the audio signal by any other known means.

At the output of the core coder 702, an encoded input signal is present which, with regard to its frequency content, is similar to the input signal but is different from the audio signal in that the encoded input signal does not include any frequency components above the predetermined frequency.

The high frequency regeneration block 703*c* is for performing the high frequency regeneration technique on the input signal, i.e., the signal input into the core coder 702, or on a coded and again decoded version thereof. In case this alternative is selected, the inventive encoder also includes a core decoder 903 that receives the encoded input signal from the core coder and decodes this signals so that exactly the same situation is obtained that is present at the decoder/receiver side, on which a high frequency regeneration technique is to be performed for enhancing the audio bandwidth for encoded signals that have been transmitted using a low bit rate.

The HFR block 703*c* outputs a regenerated signal that has frequency components above the predetermined frequency.

As it is shown in FIG. 9, the regenerated signal output by the HFR block 703*c* is input into a difference detector means 703*a*. On the other hand, the difference detector means also receives the original audio signal input at the audio signal input 900. The means for detecting differences between the regenerated signal from the HFR block 703*c* and the audio signal from the input 900 is arranged for detecting a difference between those signals, which are above a predetermined significance threshold. Several examples for preferred thresholds functioning as significance thresholds are described below.

The difference detector output is connected to an input of a difference describer block 703*b*. The difference describer block 703*b* is for describing detected differences in a certain way to obtain additional information on the detected differences. These additional information is suitable for being input into a combiner means 705 that combines the encoded input signal, the additional information and several other signals that may be produced to obtain an encoded signal to be transmitted to a receiver or to be stored on a storage medium. A prominent example for an additional information is a spectral envelope information produced by a spectral envelope estimator 704. The spectral envelope estimator 704 is arranged for providing a spectral envelope information of the audio signal above the predetermined frequency, i.e., above the cross-over frequency. This spectral envelope information is used in a HFR module on the decoder side to synthesize spectral components of a decoded audio signal above the predetermined frequency.

In a preferred embodiment of the present invention, the spectral envelope estimator 704 is arranged for providing only a coarse representation of the spectral envelope. In particular, it is preferred to provide only one spectral envelope value for each scale factor band. The use of scale factor bands is known for those skilled in the art. In connection with transform coders such as MP3 or MPEG-AAC, a scale factor band includes several MDCT lines. The detailed organisation of which spectral lines belong to which scale factor band is standardized, but may vary. Generally, a scale factor band includes several spectral lines (for example MDCT lines, wherein MDCT stands for modified discrete cosine transform), or bandpass signals, the number of which varies from scale factor band to scale factor band. Generally, one scale factor band includes at least more than two and normally more than ten or twenty spectral lines or band pass signals.

In accordance with a preferred embodiment of the present invention, the inventive encoder additionally includes a variable cross-over frequency. The control of the cross-over frequency is performed by the inventive difference detector 703*a*. The control is arranged such that, when the difference detector comes to the conclusion that a higher cross-over frequency would highly contribute to reducing artefacts that would be produced by a pure HFR, the difference detector can instruct the low pass filter 902 and the spectral envelope estimator 704 as well as the core coder 702 to put the cross-over frequency to higher frequencies for extending the bandwidth of the encoded input signal.

On the other hand, the difference detector can also be arranged for reducing the cross-over frequency in case it finds out that a certain bandwidth below the cross-over frequency is acoustically not important and can, therefore, easily be produced by an HFR synthesis in the decoder rather than having to be directly coded by the core coder.

Bits that are saved by decreasing the cross-over frequency can, on the other hand, be used for the case, in which the cross-over frequency has to be increased so that a kind of bit-saving-option can be obtained which is known for a psychoacoustic coating method. In these methods, mainly tonal components that are hard to encode, i.e., that need many bits to be coded without artefacts can consume more bits, when, on the other hand, white noisy signal portions that are easy to code, i.e., that need only a low number of bits for being coded without artefacts are also present in the signal and are recognized by a certain bit-saving control.

To summarize, the cross-over frequency control is arranged for increasing or decreasing the predetermined frequency, i.e., the cross-over frequency in response to findings made by the difference detector which, in general assesses the effectiveness and performance of the HFR block 703*c* to simulate the actual situation in a decoder.

Preferably, the difference detector 703*a* is arranged for detecting spectral lines in the audio signal that are not included in the regenerated signal. To do this, the difference detector preferably includes a predictor for performing prediction operations on the regenerated signal and the audio signal, and means for determining a difference in obtained prediction gains for the regenerated signal and the audio signal. In particular, frequency-related portions in the regenerated signal or in the audio signal are determined, in which a difference in predictor gains is larger than the gain threshold which is the significance threshold in this preferred embodiment.

It is to be noted here that the difference detector 703*a* preferably works as a frequency-selective element in that it assesses corresponding frequency bands in the regenerated signal on the one hand and the audio signal on the other hand. To this end, the difference detector can include time-frequency conversion elements for converting the audio signal and the regenerated signal. In case the regenerated signal produced by the HFR block 703*c* is already present as a frequency-related representation, which is the case in the preferred high frequency regeneration method applied for the present invention, no such time domain/frequency domain conversion means are necessary.

In case one has to use a time domain-frequency domain conversion element such as for converting the audio signal, which is normally a time-domain signal, a filter bank approach is preferred. An analysis filter bank includes a bank of suitably dimensioned adjacent band pass filter, where each band pass filter outputs a band pass signal having a bandwidth defined by the bandwidth of the respective band pass filter. The band pass filter signal can be interpreted as a time-domain signal having a restricted bandwidth compared to the signal from which it has been derived. The centre frequency of a band pass signal is defined by the location of the respective band pass filter in the analysis filter bank as it is known in the art.

As it will be described later, the preferred method for determining differences above a significance threshold is a determination based on tonality measures and, in particular, on a tonal to noise ratio, since such methods are suited to find out spectral lines in signals or to find out noise-like portions in signals in a robust and efficient manner.

Detection of Spectral Lines to be Coded

In order to be able to code the spectral lines that will be missing in the decoded output after HFR, it essential to detect these in the encoder. In order to accomplish this, a suitable synthesis of the subsequent decoder HFR needs to be performed in the encoder. This does not imply that the output of this synthesis needs to be a time domain output signal similar to that of the decoder. It is sufficient to observe and synthesise an absolute spectral representation of the HFR in the decoder. This can be accomplished by using prediction in a QMF filterbank with subsequent peak-picking of the difference in prediction gain between the original and a HFR counterpart. Instead of peak-picking of the difference in prediction gain, differences of the absolute spectrum can also be used. For both methods the frequency dependent prediction gain or the absolute spectrum of the HFR are synthesised by simply re-arranging the frequency distribution of the components similar to what the HFR will do in the decoder.

Once the two representations are obtained, the original signal and the synthesised HFR signal, the detection can be done in several ways.

Figure 1:
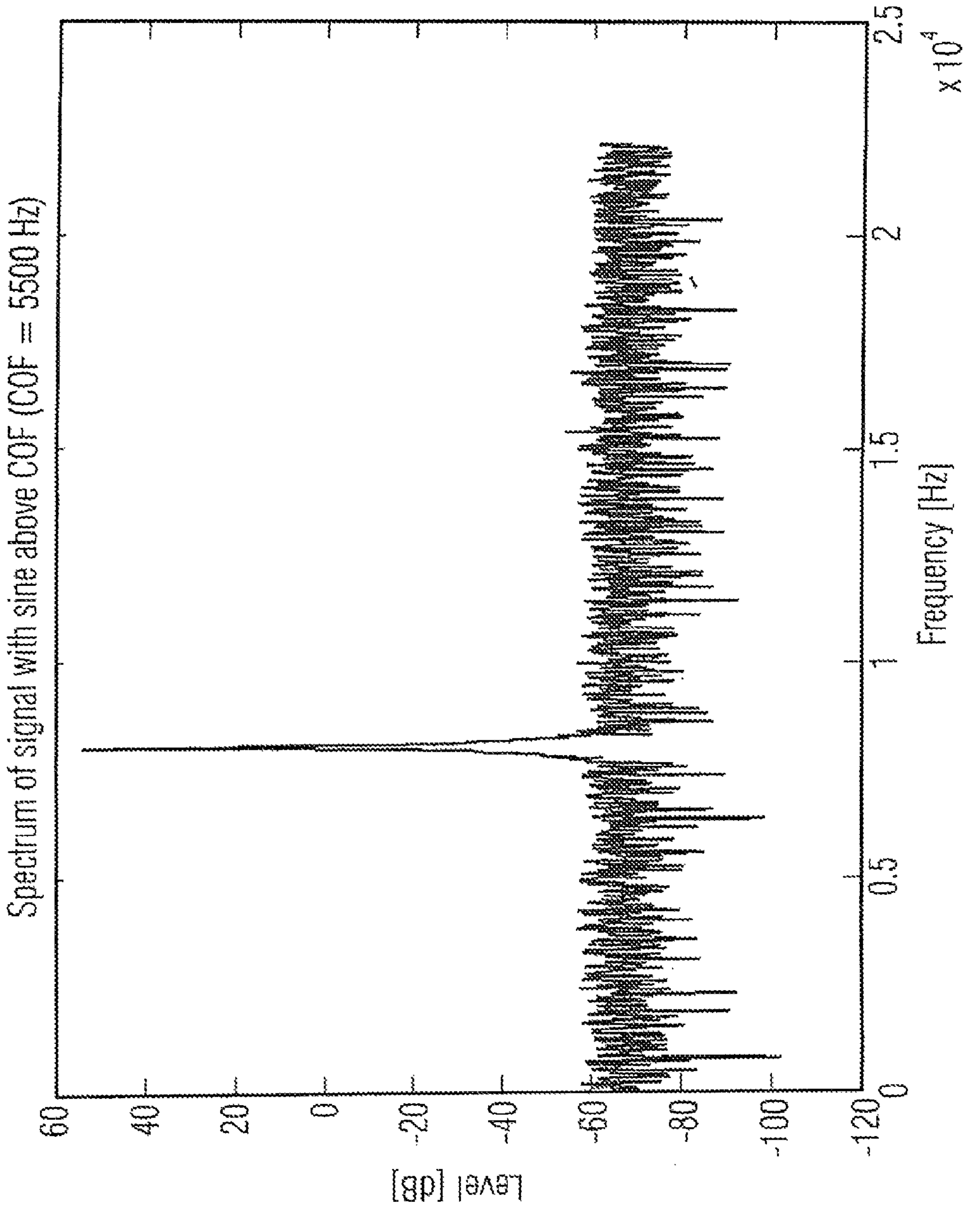
FIG. 1 illustrates spectrum of original signal with only one sine above a 5.5 kHz COF.
Figure 2:
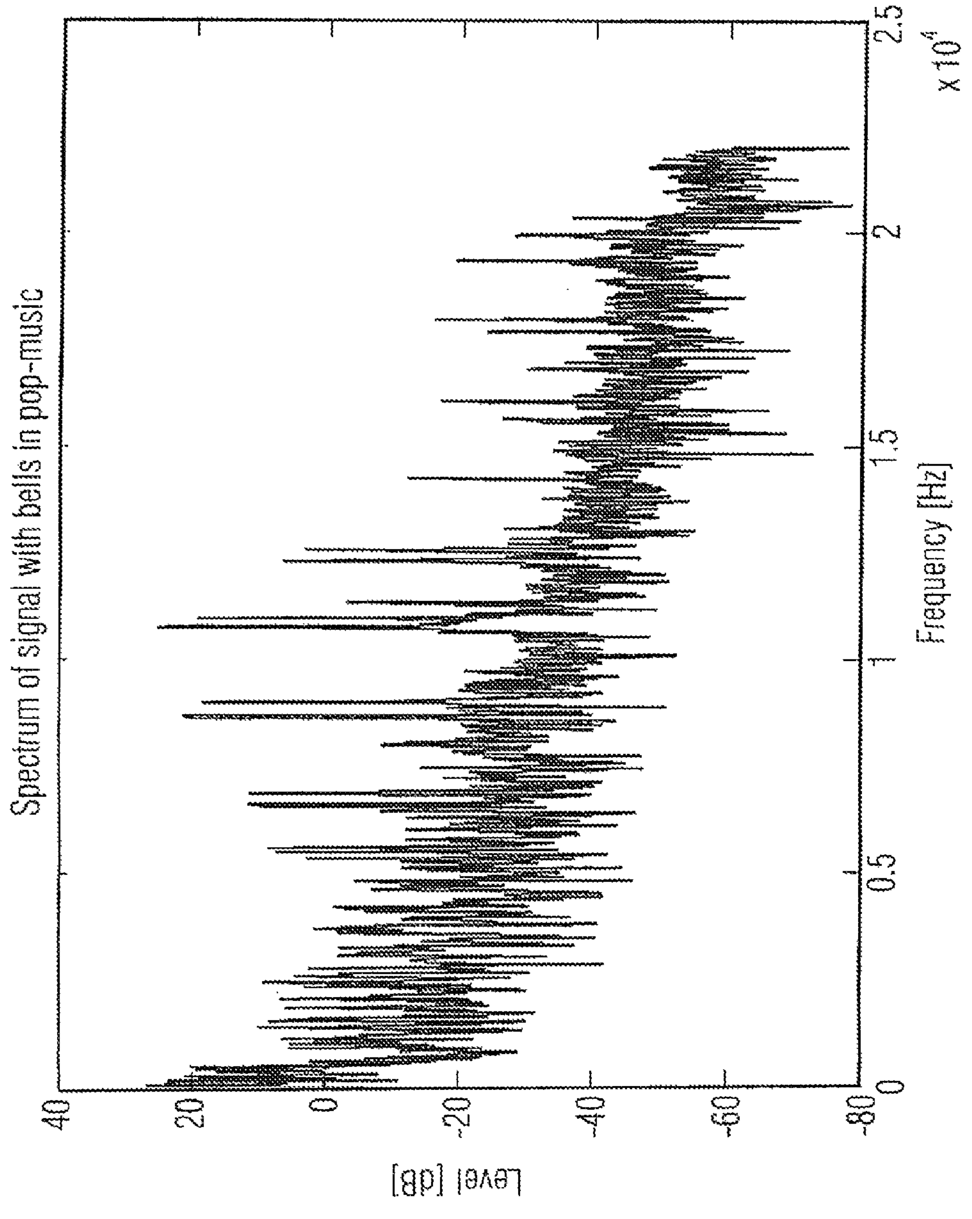
FIG. 2 illustrates spectrum of original signal containing bells in pop-music.
Figure 3:
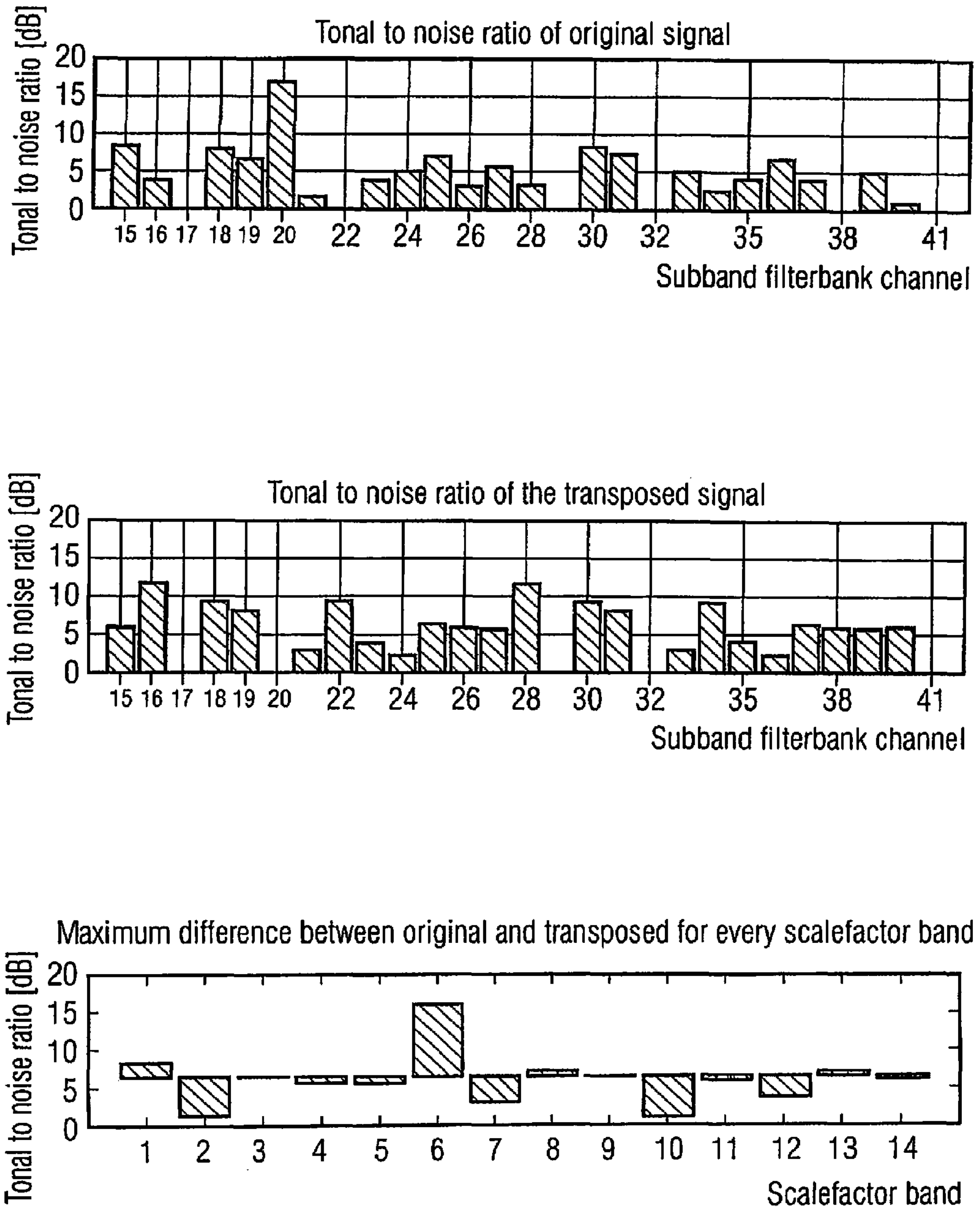
FIG. 3 illustrates detection of missing harmonics using prediction gain.

In a QMF filterbank linear prediction of low order can be performed, e.g. LPC-order 2, for the different channels. Given the energy of the predicted signal and the total energy of the signal, the tonal to noise ratio can be defined according to $$q = \frac{\Psi - E}{E}$$

where $$\Psi = |x(0)|^2 + |x(1)|^2 + \ldots + |x(N-1)|^2$$

is the energy of the signal block, and E is the energy of the prediction error block, for a given filterbank channel. This can be calculated for the original signal, and given that a representation of how the tonal to noise ratio for different frequency bands in the HFR output in the decoder can be obtained. The difference between the two on an arbitrary frequency selective base (larger than the frequency resolution of the QMF), can thus be calculated. This difference vector representing the difference of tonal to noise ratios, between the original and the expected output from the HFR in the decoder, is subsequently used to determine where an additional coding method is required, in order to compensate for the short-comings of the given HFR technique, FIG. 3. Here the tonal to noise ratio corresponding to the frequency range between subband filterbank band 15-41 is displayed for the original and a synthesised HFR output. The grid displays the scalefactor bands of the frequency range grouped in a bark-scale manner. For every scalefactor band the difference between the largest components of the original and the HFR output is calculated, and displayed in the third plot.

The above detection can also be performed using an arbitrary spectral representation of the original, and a synthesised HFR output, for instance peak-picking in an absolute spectrum ["Extraction of spectral peak parameters using a short-time Fourier transform modeling [sic] and no sidelobe windows." Ph Depalle, T Hélie, IRCAM], or similar methods, and then compare the tonal components detected in the original and the components detected in the synthesised HFR output.

When a spectral line has been deemed missing from the HFR output, it needs to be coded efficiently, transmitted to the decoder and added to the HFR output. Several approaches can be used; interleaved waveform coding, or e.g. parametric coding of the spectral line.

QMF/Hybrid Filterbank, Interleaved Wave Form Coding.

If the spectral line to be coded is situated below FS/2 of the core coder, it can be coded by the same. This means that the core coder codes the entire frequency range up to COF and also a defined frequency range surrounding the tonal component, that will not be reproduced by the HFR in the decoder. Alternatively, the tonal component can be coded by an arbitrary wave form coder, with this approach the system is not limited by the FS/2 of the core coder, but can operate on the entire frequency range of the original signal.

To this end, the core coder control unit 910 is provided in the inventive encoder. In case the difference detector 703*a* determines a significant peak above the predetermined frequency but below half the value of the sampling frequency (FS/2), it addresses the core coder 702 to core-encode a band pass signal derived from the audio signal, wherein the frequency band of the band pass signal includes the frequency, where the spectral line has been detected, and, depending on the actual implementation, also a specific frequency band, which embeds the detected spectral line. To this end, the core coder 702 itself or a controllable band pass filter within the core coder filters the relevant portion out of the audio signal, which is directly forwarded to the core coder as it is shown by a dashed line 912.

In this case, the core coder 702 works as the difference describer 703*b* in that it codes the spectral line above the cross-over frequency that has been detected by the difference detector. The additional information obtained by the difference describer 703*b*, therefore, corresponds to the encoded signal output by the core coder 702 that relates to the certain band of the audio signal above the predetermined frequency but below half the value of the sampling frequency (FS/2).

Figure 11:
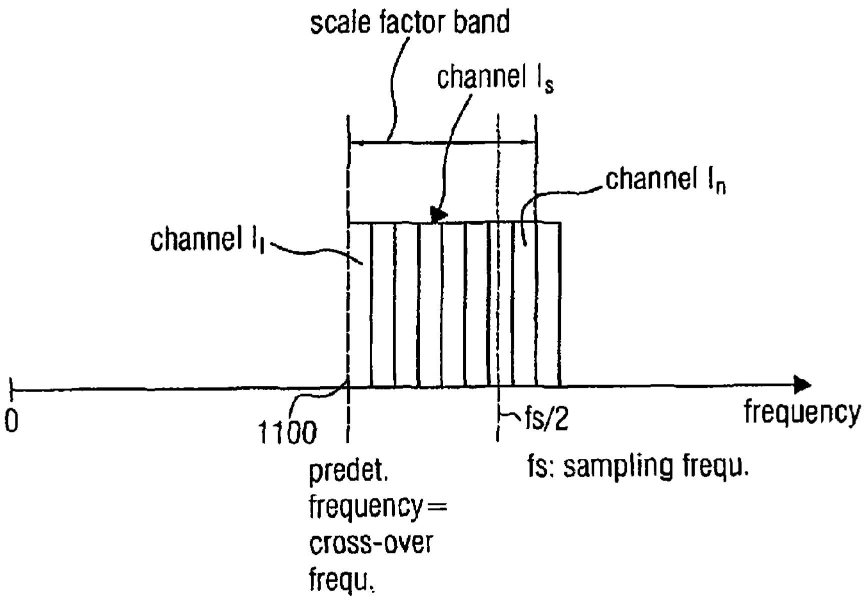
FIG. 11 is a diagram showing the organisation of the spectral range into scale factor bands and channels in relation to the cross-over frequency and the sampling frequency.

To better illustrate the frequency scheduling mentioned before, reference is made to FIG. 11. FIG. 11 shows the frequency scale starting from a 0 frequency and extending to the right in FIG. 11. At a certain frequency value, one can see the predetermined frequency 1100, which is also called the cross-over frequency. Below this frequency, the core coder 702 from FIG. 9 is active to produce the encoded input signal. Above the predetermined frequency, only the spectral envelope estimator 704 is active to obtain for example one spectral envelope value for each scale factor band. From FIG. 11, it becomes clear that a scale factor band includes several channels which in case of known transform coders correspond to frequency coefficients or band pass signals. FIG. 11 is also useful for showing the synthesis filter bank channels from the synthesis filter bank of FIG. 12 that will be described later. Additionally, reference is made to half the value of the sampling frequency FS/2, which is, in the case of FIG. 11, above the predetermined frequency.

In case a detected spectral line is above FS/2, the core coder 702 cannot work as the difference describer 703*b*. In this case, as it is outlined above, completely different coding algorithms have to be applied in the difference describer for the coding/obtaining additional information on spectral lines in the audio signal that will not be reproduced by an ordinary HFR technique.

In the following, reference is made to FIG. 10 to illustrate an inventive decoder for decoding an encoded signal. The encoded signal is input at an input 1000 into a data stream demultiplexer 801. In particular, the encoded signal includes an encoded input signal (output from the core coder 702 in FIG. 9), which represents a frequency content of an original audio signal (input into the input 900 from FIG. 9) below a predetermined frequency. The encoding of the original signal was performed in the core coder 702 using a certain known coding algorithm. The encoded signal at the input 1000 includes additional information describing detected differences between a regenerated signal and the original audio signal, the regenerated signal being generated by high frequency regeneration technique (implemented in the HFR block 703*c* in FIG. 9) from the input signal or a coded and decoded version thereof (embodiment with the core decoder 903 in FIG. 9).

In particular, the inventive decoder includes means for obtaining a decoded input signal, which is produced by decoding the encoded input signal in accordance with the coding algorithm. To this end, the inventive decoder can include a core decoder 803 as shown in FIG. 10. Alternatively, the inventive decoder can also be used as an add-on module to an existing core decoder so that the means for obtaining a decoded input signal would be implemented by using a certain input of a subsequently positioned HFR block 804 as it is shown in FIG. 10. The inventive decoder also includes a reconstructor for reconstructing detected differences based on the additional information that have been produced by the difference describer 703*b* which is shown in FIG. 9.

As a key component, the inventive decoder additionally includes a high frequency regeneration means for performing a high frequency regeneration technique similar to the high frequency regeneration technique that has been implemented by the HFR block 703*c* as shown in FIG. 9. The high frequency regeneration block outputs a regenerated signal which, in a normal HFR decoder, would be used for synthesizing the spectral portion of the audio signal that has been discarded in the encoder.

Figure 8:
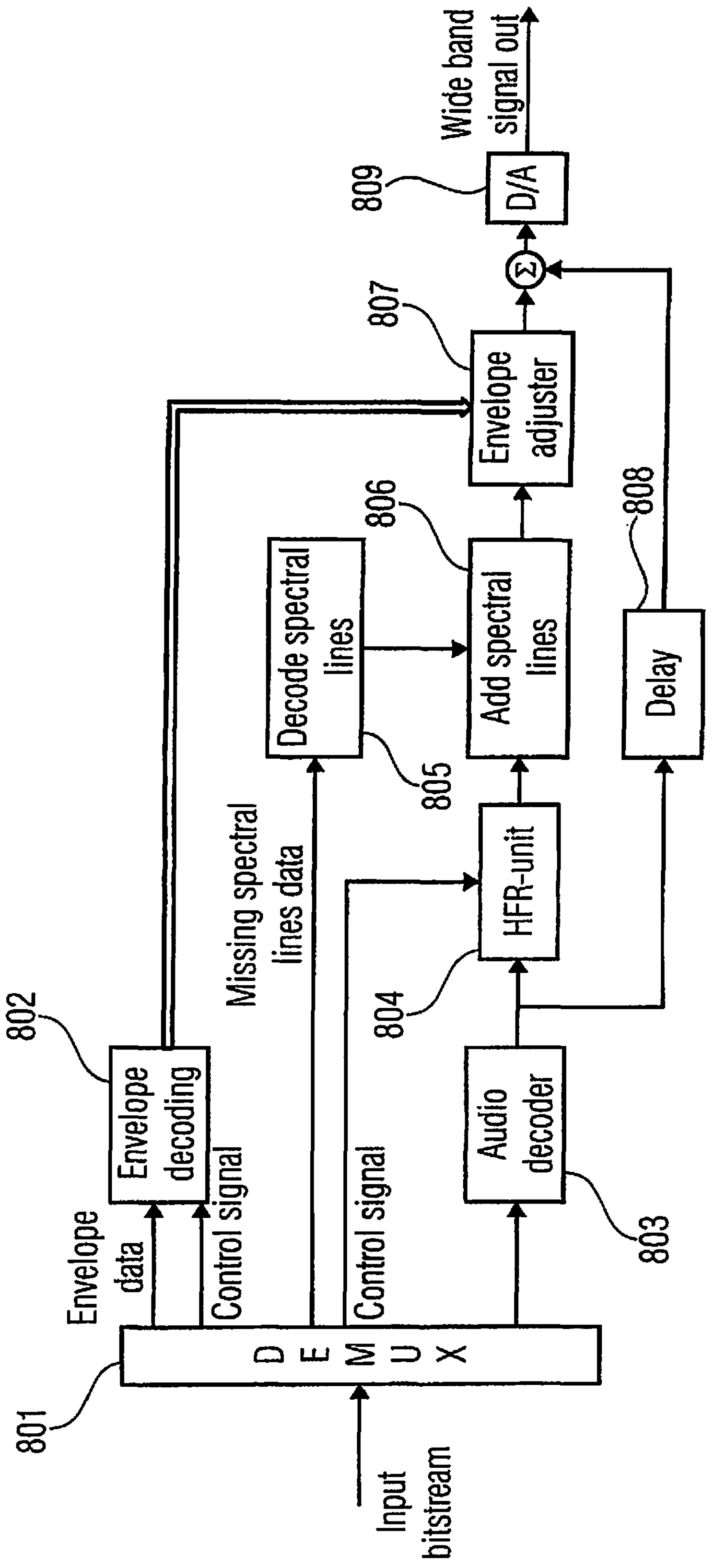
FIG. 8 illustrates a possible decoder implementation of the present invention.

In accordance with the present invention, a producer that includes the functionalities of block 806 and 807 from FIG. 8 is provided so that the audio signal output by the producer not only includes a high frequency reconstructed portion but also includes any detected differences, preferably spectral lines, that cannot be synthesized by the HFR block 804 but that were present in the original audio signal.

As will be outlined later, the producer 806, 807 can use the regenerated signal output by the HFR block 804 and simply combine it with the low band decoded signal output by the core decoder 803 and than insert spectral lines based on the additional information. Alternatively, and preferably, the producer also does some manipulation of the HFR-generated spectral lines as will be outlined with respect to FIG. 12. Generally, the producer not only simply inserts a spectral line into the HFR spectrum at a certain frequency position but also accounts for the energy of the inserted spectral line in attenuating HFR-regenerated spectral lines in the neighbourhood of the inserted spectral line.

The above proceeding is based on a spectral envelope parameter estimation performed in the encoder. In a spectral band above the predetermined frequency, i.e., the cross-over frequency, in which a spectral line is positioned, the spectral envelope estimator estimates the energy in this band. Such a band is for example a scale factor band. Since the spectral envelope estimator accumulates the energy in this band irrespective of the fact whether the energy stems from noisy spectral lines or certain remarkable peaks, i.e., tonal spectral lines, the spectral envelope estimate for the given scale factor band includes the energy of the spectral line as well as the energy of the "noisy" spectral lines in the given scale factor band.

To use the spectral energy estimate information transmitted in connection with the encoded signal as accurate as possible, the inventive decoder accounts for the energy accumulation method in the encoder by adjusting the inserted spectral line as well as the neighbouring "noisy" spectral lines in the given scale factor band so that the total energy, i.e., the energy of all lines in this band corresponds to the energy dictated by the transmitted spectral envelope estimate for this scale factor band.

Figure 12:
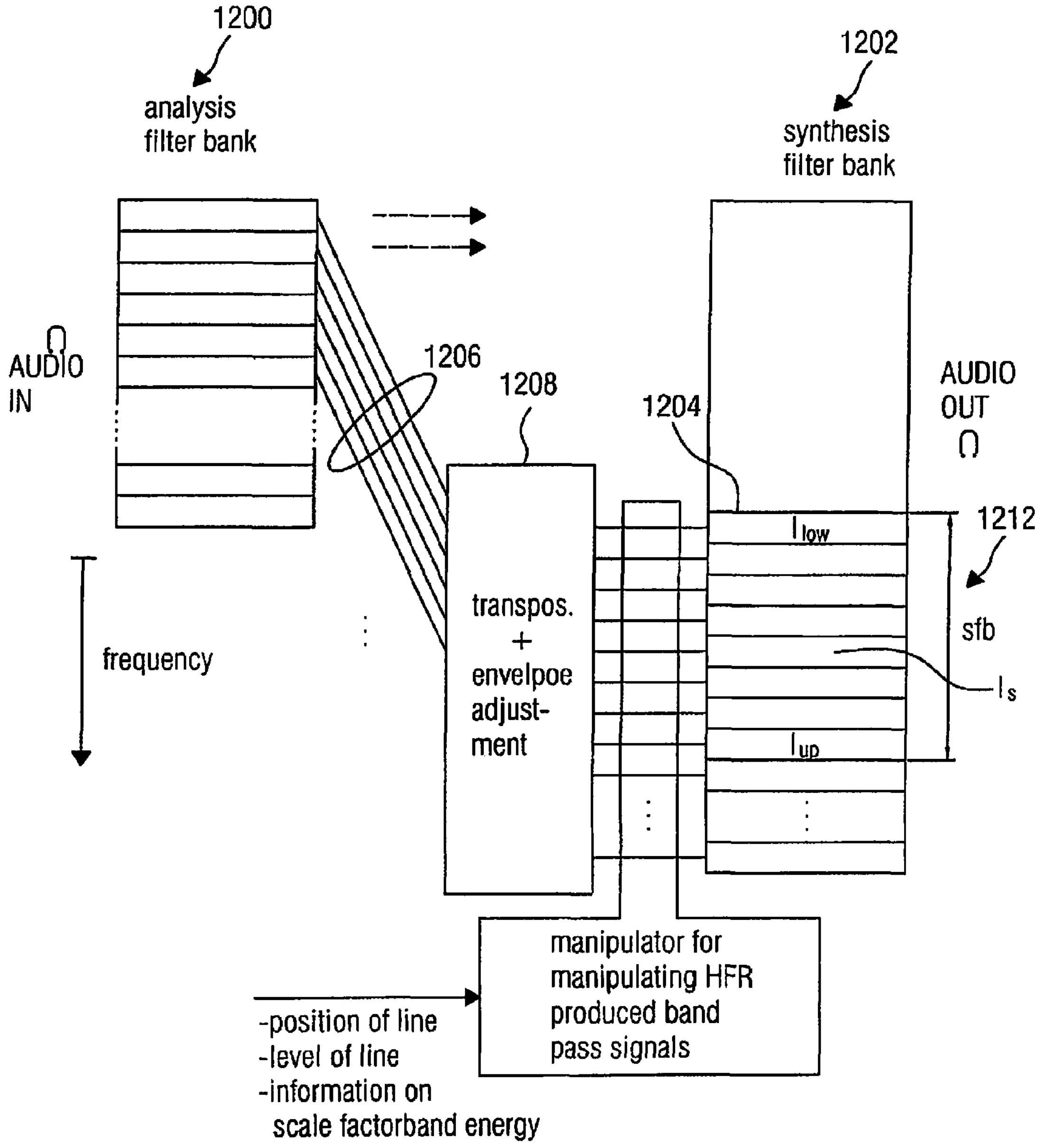
FIG. 12 is the schematic diagram for the inventive decoder in connection with an HFR transposition method based on a filter bank approach.

FIG. 12 shows a schematic diagram for the preferred HFR reconstruction based on an analysis filter bank 1200 and a synthesis filter bank 1202. The analysis filter bank as well as the synthesis filter bank consist of several filter bank channels, which are also illustrated in FIG. 11 with respect to a scale factor band and the predetermined frequency. Filter bank channels above the predetermined frequency, which is indicated by 1204 in FIG. 12 have to be reconstructed by means of filter bank signals, i.e. filter bank channels below the predetermined frequency as it is indicated in FIG. 12 by lines 1206. It is to be noted here that in each filter bank channel, a band pass signal having complex band pass signal samples is present. The high frequency reconstruction block 804 in FIG. 10 and also the HFR block 703*c* in FIG. 9 include a transposition/envelope adjustment module 1208, which is arranged for doing HFR with respect to certain HFR algorithms. It is to be noted that the block on the encoder side does not necessarily have to include an envelope adjustment module. It is preferred to estimate a tonality measure as a function of frequency. Then, when the tonality differs too much the difference in absolute spectral envelope is irrelevant.

The HFR algorithm can be a pure harmonic or an approximate harmonic HFR algorithm or can be a low-complexity HFR algorithm, which includes the transposition of several consecutive analysis filter bank channels below the predetermined frequency to certain consecutive synthesis filter bank channels above the predetermined frequency. Additionally, the block 1208 preferably includes an envelope adjustment function so that the magnitudes of the transposed spectral lines are adjusted such that the accumulated energy of the adjusted spectral lines in one scale factor band for example corresponds to the spectral envelope value for the scale factor band.

From FIG. 12 it becomes clear that one scale factor band includes several filter bank channels. An exemplary scale factor band extends from a filter bank channel $l_{low}$ until a filter bank channel $l_{up}$.

Figure 10:
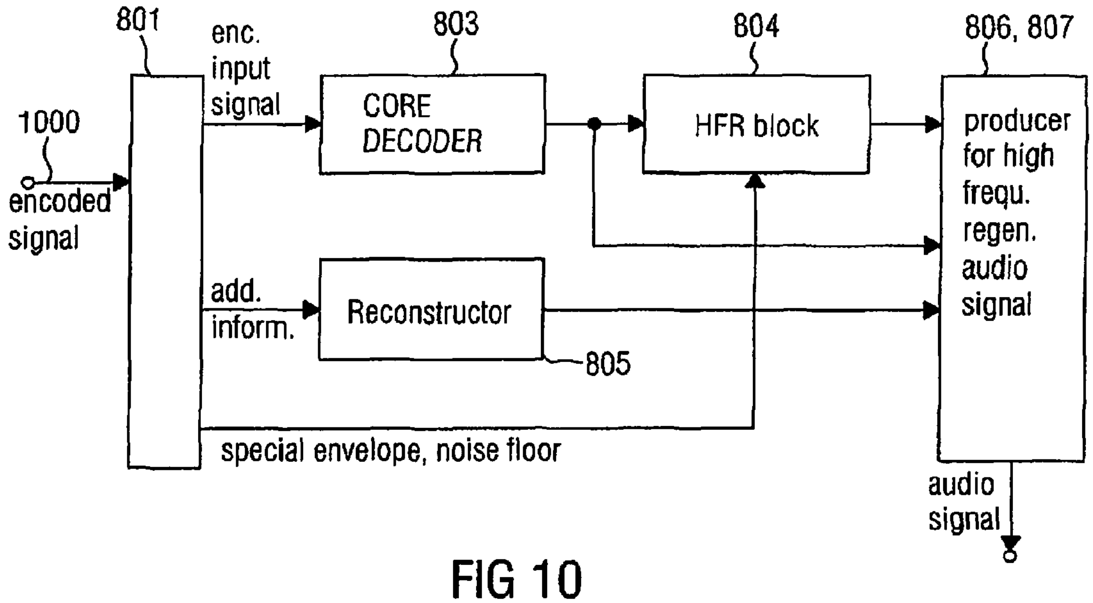
FIG. 10 illustrates a schematic diagram of an inventive decoder.

With respect to the subsequent adaption/sine insertion method, it is to be noted here that this adaption or "manipulation" is done by the producer 806, 807 in FIG. 10, which includes a manipulator 1210 for manipulating HFR produced band pass signals. As an input, this manipulator 1210 receives, from the reconstructor 805 in FIG. 10, at least the position of the line, i.e. preferably the number $l_s$, in which the to be synthesized sine is to be positioned. Additionally, the manipulator 1210 preferably receives a suitable level for this spectral line (sine wave) and, preferably, also information on a total energy of the given scale factor band sfb 1212.

It is to be noted here that a certain channel $l_s$, into which the synthetic sine signal is to be inserted is treated different from the other channels in the given scale factor band 1212 as will be outlined below. This "treatment" of the HFR-regenerated channel signals as output by the block 1208 is, as has been outlined above, done by the manipulator 1210 which is part of the producer 806, 807 from FIG. 10

Parametric Coding of Spectral Lines

An example of a filterbank based system using parametric coding of missing spectral lines is outlined below.

When using an HFR method where the system uses adaptive noise floor addition according to [PCT/SE00/00159], only the frequency location of the missing spectral line needs to be coded, since the level of the spectral line is implicitly given by the envelope data and the noise-floor data. The total energy of a given scalefactor band is given by the energy data, and the tonal/noise energy ration is given by the noise floor level data. Furthermore, in the high-frequency domain the exact location of the spectral line is of less importance, since the frequency resolution of the human auditory system is rather coarse at higher frequencies. This implies that the spectral lines can be coded very efficiently, essentially with a vector indicating for each scalefactor band whether a sine should be added in that particular band in the decoder.

The spectral lines can be generated in the decoder in several ways. One approach utilises the QMF filterbank already used for envelope adjustment of the HFR signal. This is very efficient since it is simple to generate sinewaves in a subband filterbank, provided that they are placed in the middle of a filter channel in order to not generate aliasing in adjacent channels. This is not a severe restriction since the frequency location of the spectral line is usually rather coarsely quantised.

If the spectral envelope data sent from the encoder to the decoder is represented by grouped subband filterbank energies, in time and frequency, the spectral envelope vector may at a given time be represented by:

$$\bar{e}=[e(1),e(2), \ldots ,e(M)],$$

and the noise-floor level vector may be described according to:

$$\bar{q}=[q(1),q(2), \ldots ,q(M)].$$

Here the energies and noise floor data are averaged over the QMF filterbank bands described by a vector $$\bar{v}=[lsb, \ldots ,usb],$$

containing the QMF-band entries form the lowest QMF-band used (lsb) to the highest (usb), whose length is M+1, and where the limits of each scalefactor band (in QMF bands) are given by:

$$\begin{cases} l_l = \bar{v}(n) \\ l_u = \bar{v}(n+1) - 1 \end{cases}$$

where $l_l$ is the lower limit and $l_u$ is the upper limit of scalefactor band n. In the above the noise-floor level data vector q has been mapped to the same frequency resolution as that of the energy data $\bar{e}$.

If a synthetic sine is generated in one filterbank channel, this needs to be considered for all the subband filter bank channels included in that particular scalefactorband. Since this is the highest frequency resolution of the spectral envelope in that frequency range. If this frequency resolution is also used for signalling the frequency location of the spectral lines that are missing from the HFR and needs to be added to the output, the generation and compensation for these synthetic sines can be done according to below.

Firstly, all the subband channels within the current scalefactor band need to be adjusted so the average energy for the band is retained, according to:

$$\begin{cases} y_{re}(l) = x_{re}(l) \cdot g_{hfr}(l) \\ y_{im}(l) = x_{im}(l) \cdot g_{hfr}(l) \end{cases} \forall\, l_l \le l < l_u,\ l \ne l_s$$

where $l_l$ and $l_u$ are the limits for the scalefactor band where a synthetic sine will be added, $x_{re}$ and $x_{im}$ are the real and imaginary subband samples, l is the channel index, and $$g_{hfr}(n) = \sqrt{\frac{\bar{q}(n)}{1+\bar{q}(n)}}$$

is the required gain adjustment factor, where n is the current scalefactor band. It is to be mentioned here that the above equation is not valid for the spectral line/band pass signal of the filter bank channel, in which the sine will be placed.

It is to be noted here that the above equation is only valid for the channels in the given scale factor band extending from $l_{low}$ to $l_{up}$ except the band pass signal in the channel having the number $l_s$. This signal is treated by means of the following equation group.

The manipulator 1210 performs the following equation for the channel having the channel number $l_s$, i.e. modulating the band pass signal in the channel $l_s$ by means of the complex modulation signal representing a synthetic sine wave. Additionally, the manipulator 1210 performs weighting of the spectral line output from the HFR block 1208 as well as determining the level of the synthetic sine by means of the synthetic sine adjustment factor $g_{sine}$. Therefore the following equation is valid only for a filterbank channel $l_s$ into which a sine will be placed.

Accordingly, the sine is placed in QMF channel $l_s$ where $l_l \le l_s < l_u$ according to:

$$y_{re}(l_s)=x_{re}(l_s)\cdot g_{hfr}(l_s)+g_{sin}(l_s)\cdot\overline{\Phi}_{re}(k)$$

$$y_{im}(l_s)=x_{im}(l_s)\cdot g_{hfr}(l_s)+g_{sin}(l_s)\cdot(-1)^{l_s}\cdot\overline{\Phi}_{im}(k)$$

where, k is the modulation vector index ($0 \le k < 4$) and $(-1)^{l_s}$ gives the complex conjugate for every other channel. This is required since every other channel in the QMF filterbank is frequency inverted. The modulation vector for placing a sine in the middle of a complex subband filterbank band is:

$$\begin{cases} \overline{\varphi}_{re} = [1, 0, -1, 0] \\ \overline{\varphi}_{im} = [0, 1, 0, -1] \end{cases}$$

and the level of the synthetic sine is given by:

$$g_{sine}(n) = \sqrt{\overline{e}(n)}.$$

Figure 4:
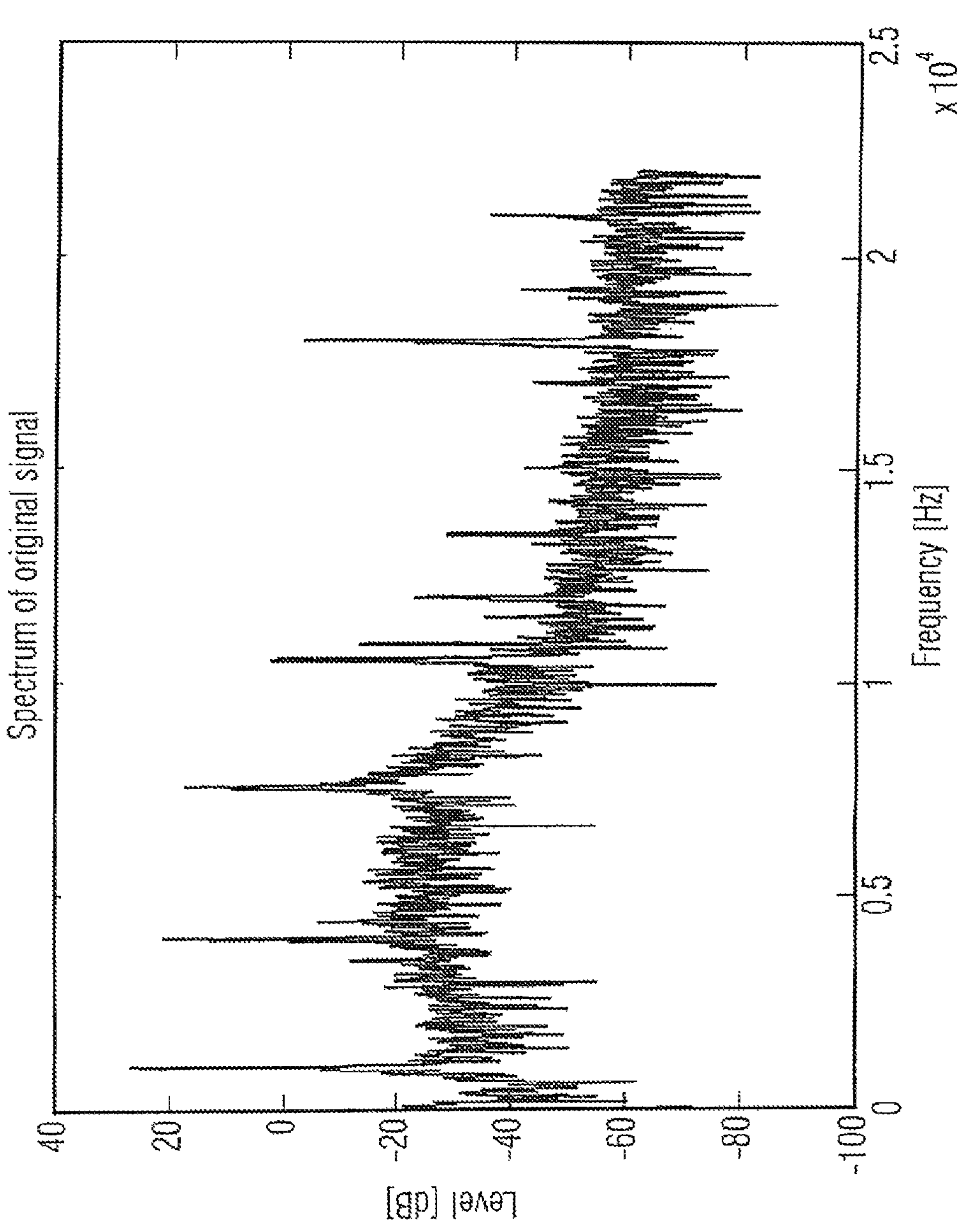
FIG. 4 illustrates the spectrum of an original signal
Figure 5:
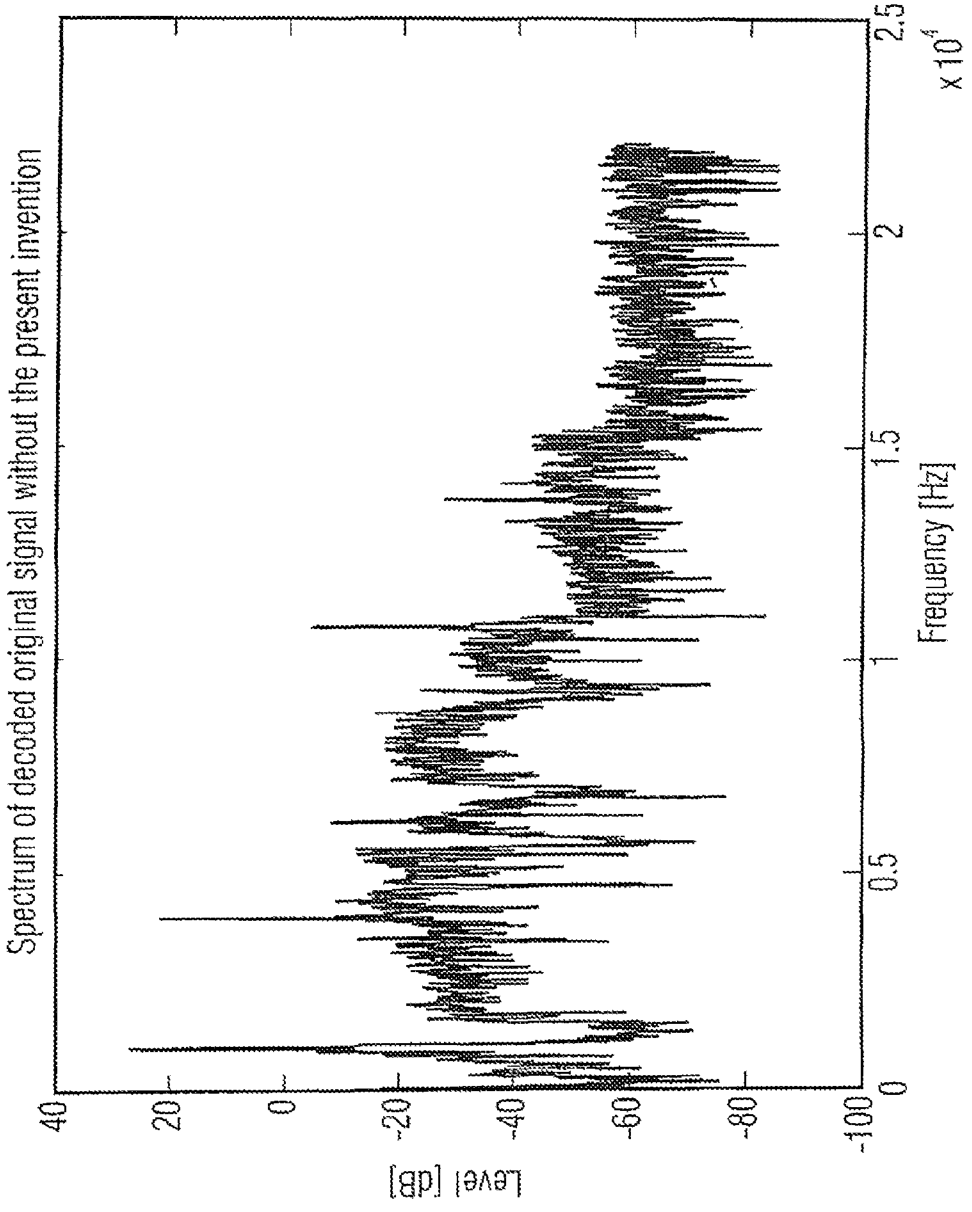
FIG. 5 illustrates the spectrum without the present invention.
Figure 6:
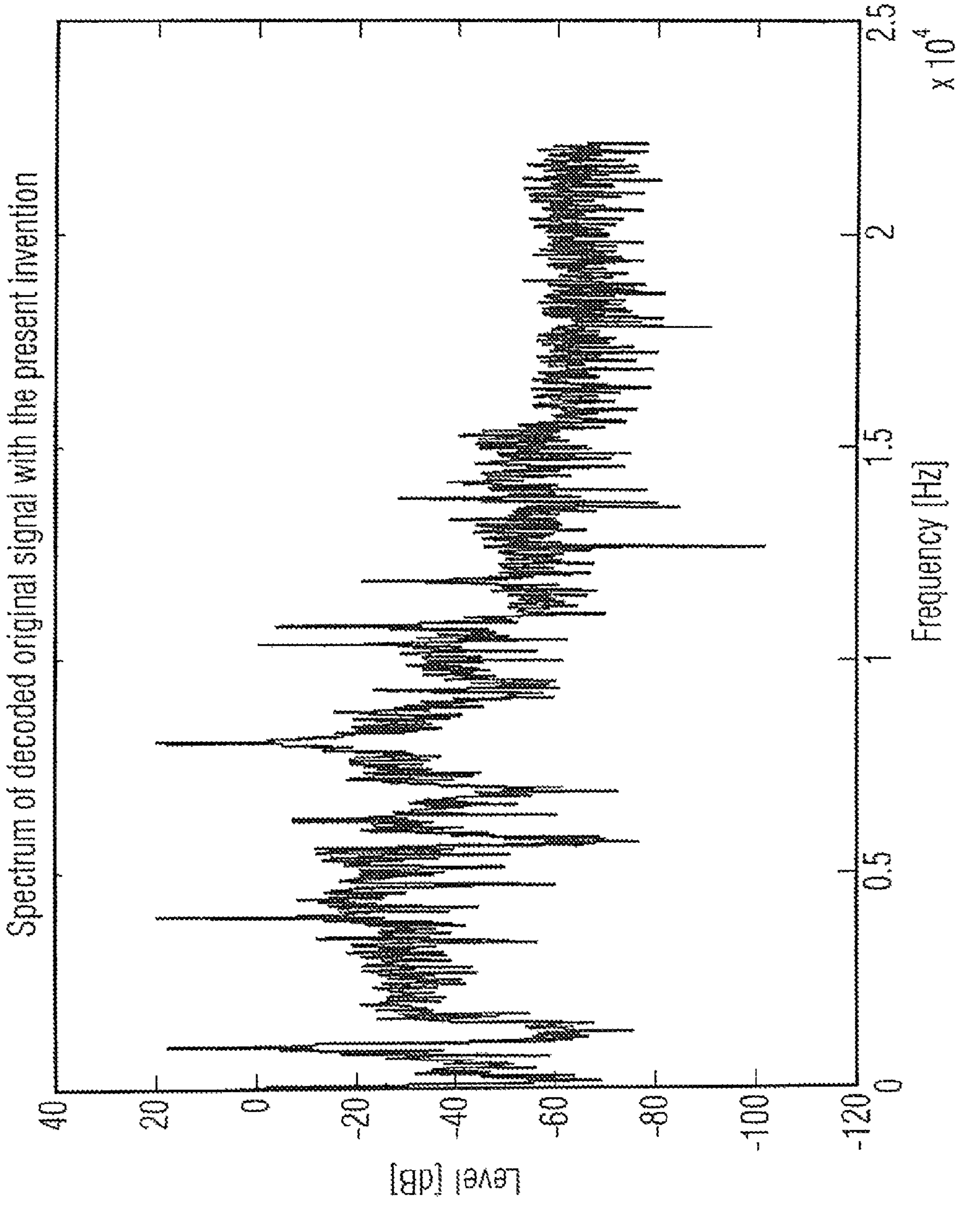
FIG. 6 illustrates the output spectrum with the present invention.

The above is displayed in FIG. 4-6 where a spectrum of the original is displayed in FIG. 4, and the spectra of the output with and without the above are displayed in FIG. 5-6. In FIG. 5, the tone in the 8 kHz range is replaced by broadband noise. In FIG. 6 a sine is inserted in the middle of the scalefactor band in the 8 kHz range, and the energy for the entire scalefactor band is adjusted so it retains the correct average energy for that scalefactor band.

Practical Implementations

Figure 7:
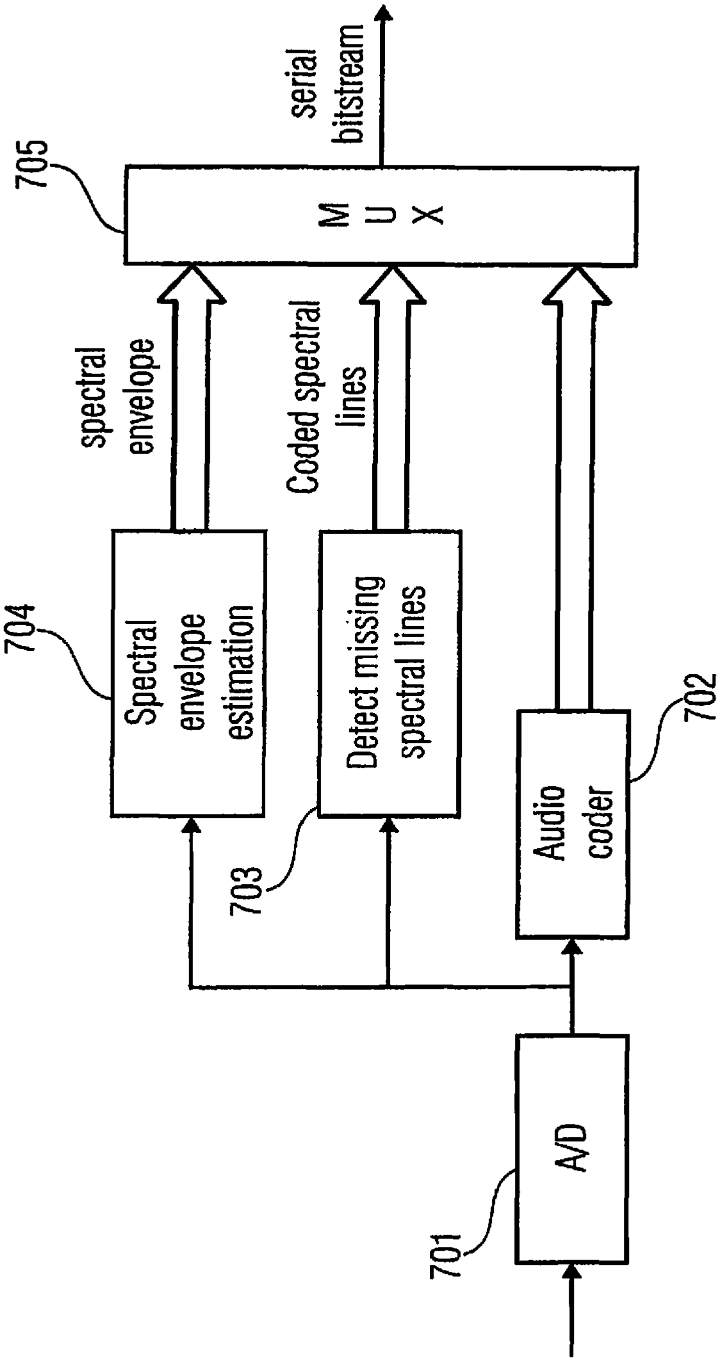
FIG. 7 illustrates a possible encoder implementation of the present invention.

The present invention can be implemented in both hardware chips and DSPs, for various kinds of systems, for storage or transmission of signals, analogue or digital, using arbitrary codecs. In FIG. 7 a possible encoder implementation of the present invention is displayed. The analogue input signal is converted to a digital counterpart 701 and fed to the core encoder 702 as well as to the parameter extraction module for the HFR 704. An analysis is performed 703 to determine which spectral lines will be missing after high-frequency reconstruction in the decoder. These spectral lines are coded in a suitable manner and multiplexed into the bitstream along with the rest of the encoded data 705. FIG. 8 displays a possible decoder implementation of the present invention. The bitstream is de-multiplexed 801, and the lowband is decoded by the core decoder 803, the highband is reconstructed using a suitable HFR-unit 804 and the additional information on the spectral lines missing after the HFR is decoded 805 and used to regenerate the missing components 806. The spectral envelope of the highband is decoded 802 and used to adjust the spectral envelope of the reconstructed highband 807. The lowband is delayed 808, in order to ensure correct time synchronisation with the reconstructed highband, and the two are added together. The digital wideband signal is converted to an analogue wideband signal 809.

Depending on implementation details, the inventive methods of encoding or decoding can be implemented in hardware or in software. The implementation can take place on a digital storage medium, in particular, a disc, a CD with electronically readable control signals, which can cooperate with a programmable computer system so that the corresponding method is performed. Generally, the present invention also relates to a computer program product with a program code stored on a machine readable carrier for performing the inventive methods, when the computer program product runs on a computer. In other words, the present invention therefore is a computer program with a program code for performing the inventive method of encoding or decoding, when the computer program runs on a computer.

It is to be noted that the above description relates to a complex system. The inventive decoder implementation, however, also works in a real-valued system. In this case the equations performed by the manipulator 1210 only include the quations for the real part.

The invention claimed is:

1. An audio decoder for decoding an encoded audio bitstream, the audio decoder comprising:

a demultiplexer for extracting a frequency domain representation of a lowband audio signal having frequency content below a predetermined frequency, envelope data, and additional information from the encoded audio bitstream;

a core decoder for receiving the frequency domain representation of the lowband audio signal and decoding the frequency domain representation of the lowband audio signal to produce a time domain lowband audio signal;

an envelope decoder for receiving the envelope data and decoding the envelope data to produce an estimated spectral envelope;

an analysis filterbank for filtering the time domain lowband audio signal to produce a subband domain representation of the lowband audio signal;

a high frequency reconstructor for regenerating a subband domain representation of a highband audio signal from the subband domain representation of the lowband audio signal;

a manipulator for adding a spectral line that is a sinusoidal component specified by the additional information to the subband domain representation of the highband audio signal;

an envelope adjuster for adjusting a spectral envelope of the subband domain representation of the highband audio signal based, at least in part, on the estimated spectral envelope; and a synthesis filterbank for combining the subband domain representation of the lowband audio signal and the subband domain representation of the highband audio signal to produce a wideband time domain audio signal, and output the produced wideband time domain audio signal;

wherein the high frequency reconstructor includes a transposer for transposing several consecutive analysis filter bank channels below the predetermined frequency to certain consecutive synthesis filter bank channels above the predetermined frequency, wherein the analysis filterbank and the synthesis filterbank are complex quadrature mirror filter (QMF) banks, wherein the predetermined frequency includes a variable cross-over frequency, wherein the core decoder operates at half the sampling rate of the high frequency reconstructor, wherein the additional information includes a location of the spectral line, wherein the location represents a filterbank channel, wherein the spectral line is added to a middle of a scalefactor band associated with the location, wherein the envelope adjuster compensates for the spectral line added by the manipulator based, at least in part, on the estimated spectral envelope, wherein the additional information further includes noise floor data and the manipulator uses the noise floor data for determining a level of the spectral line, wherein the subband domain representation of the lowband audio signal is delayed a number of subband samples for synchronization with the subband domain representation of the highband audio signal, and wherein one or more of the demultiplexer, the core decoder, the envelope decoder, the analysis filterbank, the high frequency reconstructor, the manipulator, the envelope adjuster, and the synthesis filterbank are implemented, at least in part, by one or more hardware elements of the audio decoder.

2. The audio decoder of claim 1, wherein the manipulator comprises a parametric decoder of the spectral line or a waveform decoder of the spectral line.

3. The audio decoder of claim 1 wherein the high frequency reconstructor operates at 44.1 kHz.

4. A method for decoding an encoded audio bitstream, the method comprising:

extracting a frequency domain representation of a lowband audio signal having frequency content below a predetermined frequency, envelope data, and additional information from the encoded audio bitstream;

receiving the frequency domain representation of the lowband audio signal and decoding the frequency domain representation of the lowband audio signal to produce a time domain lowband audio signal;

receiving the envelope data and decoding the envelope data to produce an estimated spectral envelope;

filtering the time domain lowband audio signal to produce a subband domain representation of the lowband audio signal;

regenerating a subband domain representation of a highband audio signal from the subband domain representation of the lowband audio signal;

adding a spectral line that is a sinusoidal component specified by the additional information to the subband domain representation of the highband audio signal;

adjusting a spectral envelope of the subband domain representation of the highband audio signal based, at least in part, on the estimated spectral envelope; and combining the subband domain representation of the lowband audio signal and the subband domain representation of the highband audio signal to produce a wideband time domain audio signal, the produced wideband time domain audio signal is output as a wideband signal, wherein the regenerating includes transposing several consecutive analysis filter bank channels below the predetermined frequency to certain consecutive synthesis filter bank channels above the predetermined frequency, wherein the filtering and the combining are implemented with complex quadrature mirror filter (QMF) banks, wherein the predetermined frequency includes a variable cross-over frequency, wherein the decoding the frequency domain representation of the lowband audio signal operates at half the sampling rate of the regenerating, wherein the additional information includes a location of the spectral line, wherein the location represents a filterbank channel, wherein the spectral line is added to a middle of a scalefactor band associated with the location, wherein the adjusting further includes compensating for the spectral line based, at least in part, on the estimated spectral envelope, wherein the additional information further includes noise floor data and the adding further includes using the noise floor data for determining a level of the spectral line, wherein the subband domain representation of the lowband audio signal is delayed a number of subband samples for synchronization with the subband domain representation of the highband audio signal, and wherein the method is performed, at least in part, with one or more hardware elements.

5. A non-transitory computer readable medium containing instructions that when executed by a processor perform the method of claim 4.

* * * * *